United States Patent

Atsuta

[11] Patent Number: 5,986,385
[45] Date of Patent: *Nov. 16, 1999

[54] VIBRATION DRIVEN MOTOR OR ACTUATOR

[75] Inventor: Akio Atsuta, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/139,067

[22] Filed: Oct. 21, 1993

Related U.S. Application Data

[63] Continuation of application No. 08/009,935, Jan. 27, 1993, abandoned.

[30] Foreign Application Priority Data

Jan. 29, 1992 [JP] Japan .................................. 4-013825

[51] Int. Cl.⁶ ...................................................... H01L 41/08
[52] U.S. Cl. ......................... 310/323; 310/316; 310/312; 318/116
[58] Field of Search ..................... 310/311, 312, 310/316, 317, 319, 323, 328, 321; 318/116

[56] References Cited

U.S. PATENT DOCUMENTS

| | | | |
|---|---|---|---|
| 4,713,571 | 12/1987 | Suzuki et al. ............................ | 310/316 |
| 4,728,843 | 3/1988 | Mishiro .................................... | 310/325 |
| 4,812,697 | 3/1989 | Mishiro .................................... | 310/323 |
| 4,965,482 | 10/1990 | Ohnishi et al. ........................... | 310/323 |
| 5,001,404 | 3/1991 | Kataoka ................................... | 318/116 |
| 5,051,647 | 9/1991 | Uchikawa et al. ....................... | 310/323 |
| 5,115,161 | 5/1992 | Myohiga et al. ......................... | 310/323 |
| 5,122,700 | 6/1992 | Tamai et al. ............................. | 310/323 |
| 5,134,333 | 7/1992 | Atsuta ...................................... | 310/323 |
| 5,192,889 | 3/1993 | Myohga .................................... | 310/316 |
| 5,231,325 | 7/1993 | Tamai et al. ............................. | 310/323 |
| 5,233,274 | 8/1993 | Honda et al. ........................ | 310/323 X |

FOREIGN PATENT DOCUMENTS

| | | |
|---|---|---|
| 0469883 | 2/1992 | European Pat. Off. . |
| 538791A1 | 4/1993 | European Pat. Off. . |

OTHER PUBLICATIONS

European Search Report dated Jun. 4, 1997.
Patent Abstracts of Japan, vol. 15, No. 428 (E–1128), Oct. 30, 1991.
Patent Abstracts of Japan, vol. 16, No. 318 (E–1232), Jul. 13, 1992.
Patent Abstracts of Japan, vol. 16, No. 367 (E–1245), Aug. 7, 1992.

*Primary Examiner*—Mark O. Budd
*Attorney, Agent, or Firm*—Fitzpatrick, Cella, Harper & Scinto

[57] ABSTRACT

A vibration driven motor or actuator has a piezoelectric element, arranged in a vibrating member, for generating a vibration in a first direction, and another piezoelectric element, arranged in the vibrating member, for generating a vibration in a second direction different from the first direction. In the motor or actuator, the vibrating member has a recess portion which shaved e.g., by a laser, or a portion added with a mass, so that the natural frequencies of a given vibration mode of the vibrations in the first and second directions coincide or substantially coincide with each other.

30 Claims, 7 Drawing Sheets

VIBRATION DRIVEN MOTOR OR ACTUATOR

This application is a continuation of, application Ser. No. 08/009,935 filed Jan. 27, 1993, now abandoned.

BACKGROUND OF THE INVENTION

1. Field of the Invention

The present invention relates to a normal mode adjustment position detection method and adjustment method for a bar-shaped or annular vibration driven motor or actuator.

2. Related Background Art

FIG. 7 is an exploded perspective view of a vibrating member of a bar-shaped vibration driven motor, and FIG. 8 is a longitudinal sectional view of the bar-shaped vibration driven motor.

In a conventional vibrating member, a driving A-phase piezoelectric element a1 including a group of two piezoelectric element plates PZT1 and PZT2, a driving B-phase piezoelectric element a2 including a group of two piezoelectric element plates PZT3 and PZT4, and a sensor piezoelectric element s1 including a piezoelectric element plate are stacked, as shown in FIG. 7. Electrode plates A1 and A2 for supplying power to the piezoelectric elements, and a sensor signal output electrode plate S are sandwiched between respective adjacent piezoelectric elements. In addition, GND electrode plates G1, G2, and G3 are arranged for giving a GND potential. Metal blocks b1 and b2 formed of, e.g., brass or stainless steel, which causes relatively small vibration attenuation, are arranged to clamp these piezoelectric element plates and electrode plates. The metal blocks b1 and b2 are fastened by a fastening bolt c to obtain an integrated structure, thereby applying a compression stress to the piezoelectric element plates. In this vibrating member, since an insulating sheet d is inserted between the bolt c and the metal block b2, only one sensor piezoelectric element s1 need be used.

The A- and B-phase piezoelectric elements a1 and a2 have an angular displacement of 90° therebetween. These piezoelectric elements a1 and a2 respectively excite bending vibrations in directions within two orthogonal planes including the axis of the vibrating member, and have a proper temporal phase difference therebetween. Thus, surface portions of the vibrating member are caused to form a circular or elliptic motion, thereby frictionally driving a moving member pressed against the upper portion of the vibrating member.

FIG. 8 shows an example wherein such a vibrating member is used in a bar-shaped vibration driven motor. In this example, the fastening bolt c of the vibrating member has a small-diameter column portion c2 at its distal end portion. A fixing member g fixed to the distal end portion of the column portion c2 can fix the motor itself, and can also rotatably support, e.g., a rotor r. The rotor r contacts the front end face of the front metal block b1, and a pressure is given by pressing a coil spring h in a spring case i inserted in the rotor r through a bearing member e and a gear f.

In order to obtain high efficiency, both a bar-shaped vibration driven motors and annular vibration driven motor are designed, so that the natural frequencies of normal modes of two phases excited in the vibrating member coincide with each other.

However, in practice, each of these natural frequencies is shifted relative to the other due to variations in the material of the metal blocks constituting the vibrating member, pressure variations in the portions for clamping the PZT elements, and the like. Thus, when the two phases are driven at the same frequency, the amplitudes generated by the two phases have a difference therebetween, and a circular motion formed at the mass point of the vibrating member is distorted, resulting in a decrease in motor efficiency.

SUMMARY OF THE INVENTION

The present invention has been made to solve these conventional problems, and has as its object to provide an adjustment position detection method and an adjustment method for decreasing any difference between the normal frequencies of the two natural modes excited in a vibrating member as much as possible.

It is another object of the present invention to provide a vibration driven motor or actuator, which has a structure for causing the natural frequencies of normal modes of two phases excited in a vibrating member to coincide with each other.

Other objects of the present invention will become apparent from the following detailed description of the present invention.

One aspect of the present invention is characterized in that a recess portion is formed in a predetermined portion of a vibrating member e.g., by a laser, or by adding thereto a member having a predetermined mass so as to cause the natural frequencies of normal modes of at least two phases excited in the vibrating member to coincide with each other.

In order to achieve the above objects of the present invention, a normal mode adjustment position detection method for a vibration driven motor is characterized in that AC voltages are applied to two, i.e., A- and B-phase driving electro-mechanical energy conversion elements in a vibrating member of a vibration driven motor, and an adjustment position is detected on the basis of the magnitudes of the voltages and currents at a given frequency and phase differences therebetween.

Another aspect of the present invention is characterized in that a current value is measured while changing the magnitudes of AC voltages to be applied to two, i.e., A- and B-phase driving electro-mechanical energy conversion elements in a vibrating member of a vibration driven motor, and phase differences therebetween, and a position where the measured current value has a peak value is determined as a normal mode adjustment position.

Still another aspect of the present invention is characterized in that the detected adjustment position is shaved e.g., by a laser, so that a phase having a higher normal frequency of a natural mode than the other phase is adjusted to lower the natural frequency, or vice versa.

DETAILED DESCRIPTION OF THE PREFERRED EMBODIMENTS

Figure 1:
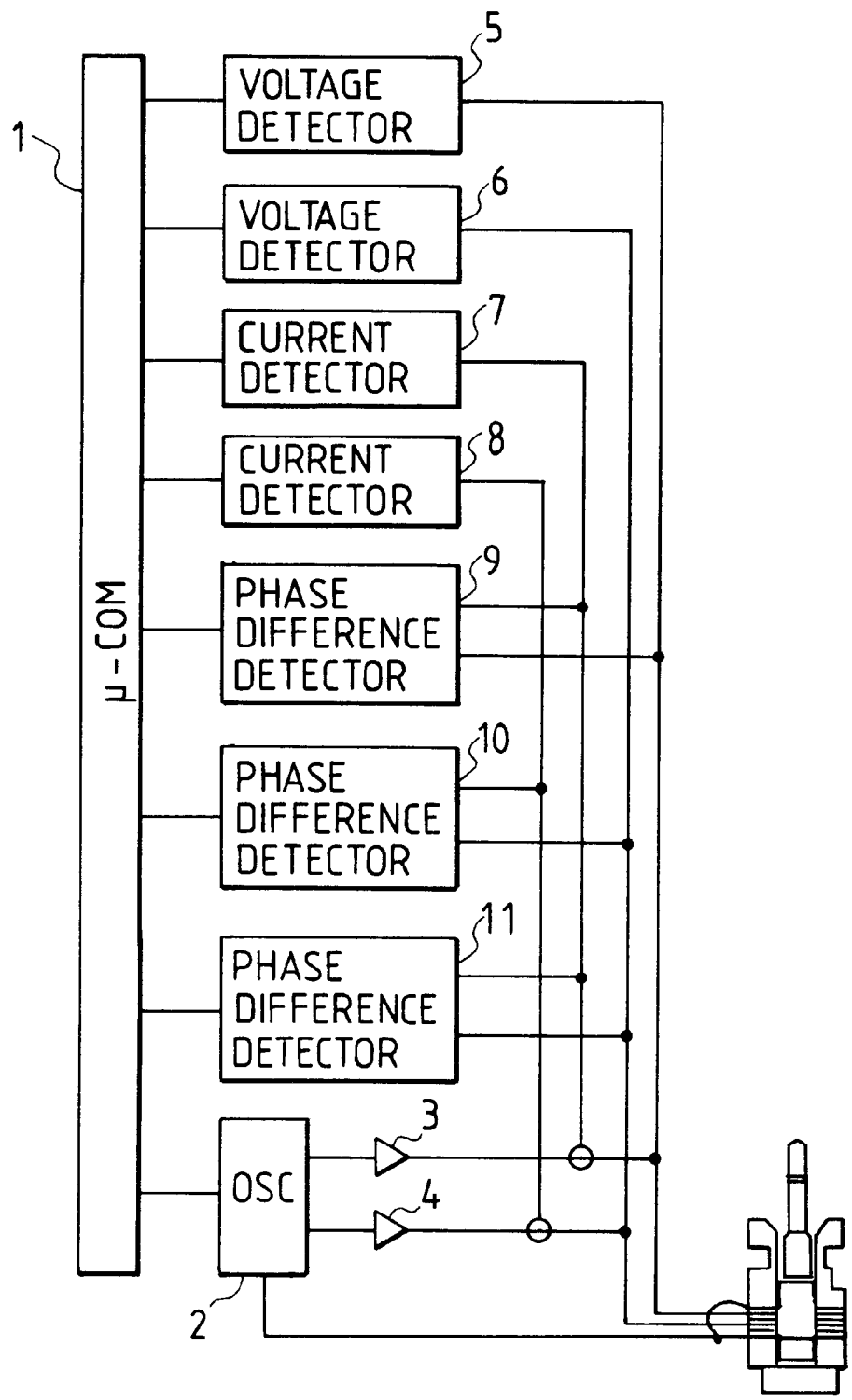
FIG. 1 is a block diagram showing a circuit arrangement of a detection apparatus according to an embodiment of the present invention, which apparatus can effectively practice a method of the present invention.

FIG. 1 is a block diagram showing a circuit arrangement of a detection apparatus according an embodiment of the present invention, which apparatus can effectively practice a method of the present invention.

The detection apparatus comprises an arithmetic microcomputer ($\mu$-com) 1 for controlling the entire apparatus, an oscillator 2, driving amplifiers 3 and 4 (for A and B phases), a voltage detector 5 for an A-phase piezoelectric element a1, a voltage detector 6 for a B-phase piezoelectric element a2, a current detector 7 for the A-phase piezoelectric element a1, a current detector 8 for the B-phase piezoelectric element a2, a phase difference detector 9 for detecting a phase difference between an A-phase voltage and an A-phase current, a phase difference detector 10 for detecting a phase difference between a B-phase voltage and a B-phase current, and a phase difference detector 11 for detecting a phase difference between an A-phase current and a B-phase voltage.

The arithmetic microcomputer 1 supplies a signal for sweeping the output frequency of the oscillator 2 within a predetermined frequency range to the oscillator 2. The output from the oscillator 2 is applied via the amplifiers 3 and 4 to the piezoelectric elements a1 and a2, which are the same as the A- and B-phase driving piezoelectric elements a1 and a2 shown in FIGS. 7 and 8. At this time, if the natural frequency of a given normal mode is present within the sweep frequency range, the admittance (current/voltage) is maximized at the natural frequency. The present invention detects the natural frequency by utilizing these characteristics.

Figure 2A:
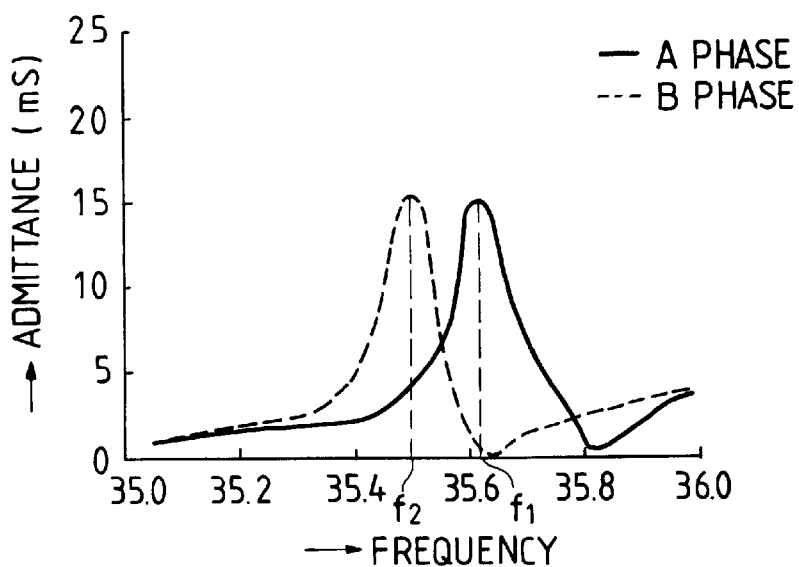
FIGS. 2A to 2E are graphs showing the frequency-admittance characteristics of a vibration driven motor shown in FIG. 1.
Figure 2B:
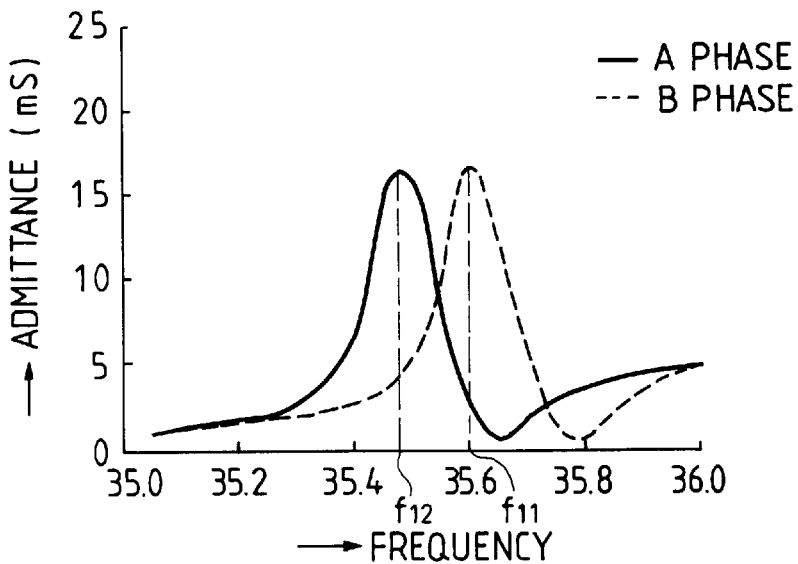
Figure 2C:
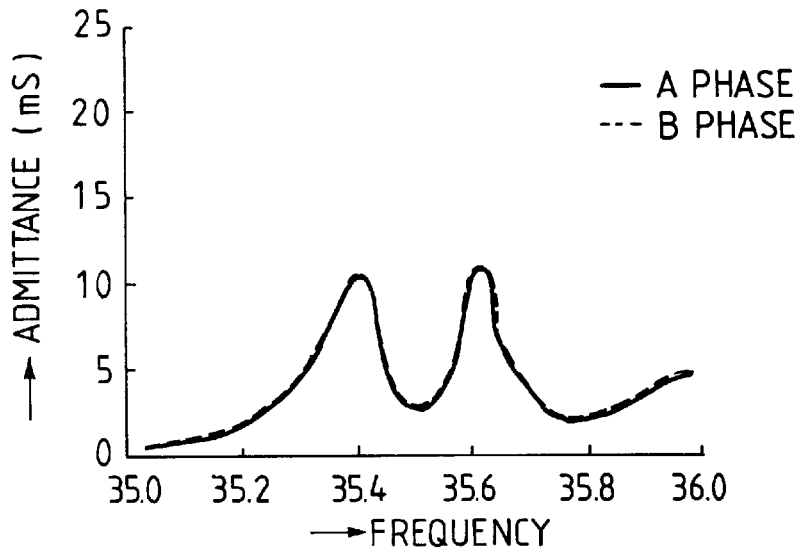

When the frequency sweep (scan) operation and the measurement of the voltages and currents are performed for both the A and B phases, the natural frequencies in two directions can be obtained. FIGS. 2A, 2B, and 2C show the admittance characteristics obtained in this process.

FIG. 2A is a graph showing the characteristics of a vibrating member (see FIG. 7), which has a high rigidity in, e.g., the direction for vibrating the piezoelectric element of A-phase (X-direction), and a low rigidity in the direction for vibrating the piezoelectric element of B-phase (Y-direction), different by 90° from the X-direction. In FIG. 2A, a solid curve represents the characteristics between the frequency of a voltage applied to the A-phase piezoelectric element a1, and the admittance at each frequency. Also, a dotted curve represents the characteristics between the frequency of a voltage applied to the B-phase piezoelectric element a2, and the admittance at each frequency.

FIG. 2B is a graph showing the admittance characteristics of a vibrating member different from that of FIG. 2A, i.e., a vibrating member which has a low rigidity in the X-direction and a high rigidity in the Y-direction. In FIG. 2B, a solid curve represents the admittance characteristics of the A phase upon application of an AC voltage to the A phase, and a dotted curve represents the admittance characteristics of the B phase upon application of an AC voltage to the B phase.

FIG. 2C is a graph showing the characteristics of a vibrating member in which the directions of high and low rigidities of the member are different from those of the vibrating members shown in FIGS. 2A and 2B. In FIG. 2C, solid and dotted curves are the same as those in the cases shown in FIGS. 2A and 2B.

A method of obtaining directions of high and low rigidities of the vibrating member on the basis of the admittances and phases will be described below.

Figure 7:
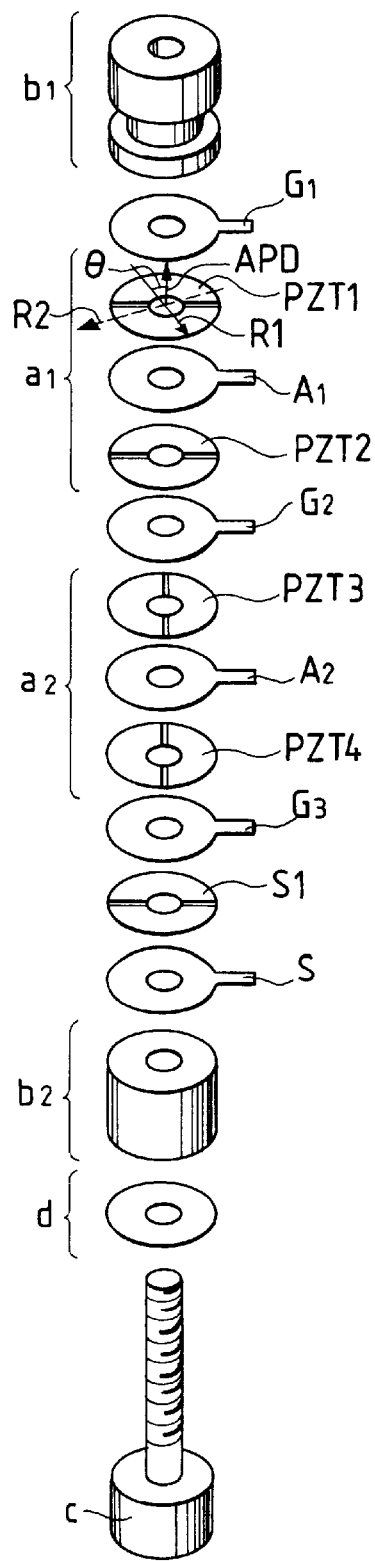
FIG. 7 is an exploded perspective view of a conventional vibration driven motor.
Figure 8:
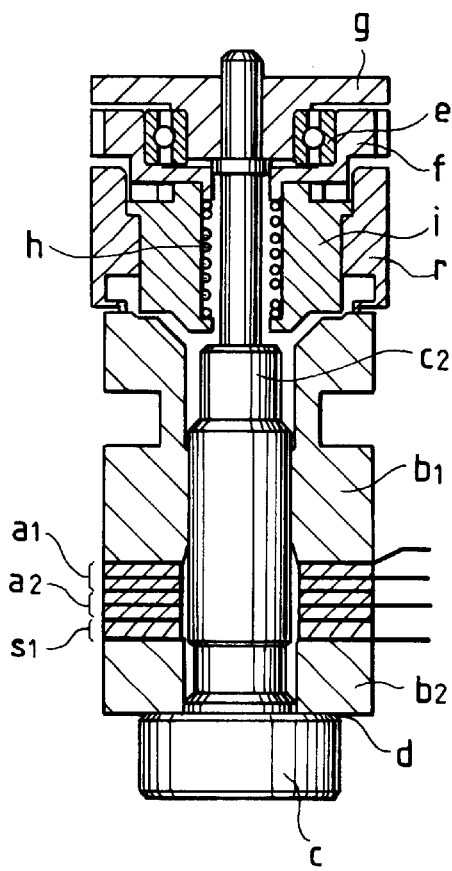
FIG. 8 is a longitudinal sectional view of a bar-shaped vibration driven motor.

Assume that the angle of a shift from a vibration application direction APD (see FIG. 7) of the A-phase piezoelectric element a1 is represented by $\theta$ (see FIG. 7).

A direction in which the rigidities of the components a1, a2, b1, b2, c, and d shown in FIG. 7 are originally high will be referred to as an X mode hereinafter, and a direction in which the rigidities of these components are low will be referred to as a Y mode hereinafter.

Also, we have the following definitions:

Axa=force factor when A-phase piezoelectric element a1 drives X mode of vibrating member Aya=force factor when A-phase piezoelectric element a1 drives Y mode of vibrating member Axb=force factor when B-phase piezoelectric element a2 drives X mode of vibrating member Ayb=force factor when B-phase piezoelectric element a2 drives Y mode of vibrating member Zmx=mechanical impedance of vibration in X mode of vibrating member An admittance Yaa of the A-phase piezoelectric element a1 upon driving of A-phase piezoelectric element a1 is given by:

$$Yaa = \frac{\text{output of } A\text{-phase current detector 7}}{\text{output of } A\text{-phase voltage detector 5}} \times \cos(\text{output of phase difference detector 9}) + j\frac{\text{output of } A\text{-phase current detector 7}}{\text{output of } A\text{-phase voltage detector 5}} \times \sin(\text{output of phase difference detector 9}) \quad (1)$$

An admittance Ybb of the B-phase piezoelectric element a2 upon driving of the B-phase piezoelectric element a2 is given by:

$$Ybb = \frac{\text{output of } B\text{-phase current detector 8}}{\text{output of } B\text{-phase voltage detector 6}} \times \cos(\text{output of phase difference detector 10}) + j\frac{\text{output of } B\text{-phase current detector 8}}{\text{output of } B\text{-phase voltage detector 6}} \times \sin(\text{output of phase difference detector 10}) \quad (2)$$

A relationship Yab between the current of the A-phase piezoelectric element a1 and the voltage of the B-phase piezoelectric element a2 upon driving of the B-phase piezoelectric element a2 is given by:

$$Yab = \frac{\text{output of } A\text{-phase current detector 7}}{\text{output of } B\text{-phase voltage detector 6}} \times \quad (3)$$

-continued $$j\frac{\text{output of }A\text{-phase current detector 7}}{\text{output of }B\text{-phase voltage detector 6}} \times$$

$$\sin(\text{output of phase difference detector 11})$$

At this time, it is assumed that the assembling errors of the piezoelectric elements a1 and a2 are negligible.

Also, we have:

$$\sqrt{A^2xa + A^2ya} = A$$
$$\sqrt{A^2xb + A^2yb} = B$$
$$A = B$$

For
$$\begin{array}{l}Axa = A\cos\theta \\ Aya = A\sin\theta \\ Ayb = A\cos\theta \\ -Axb = A\sin\theta\end{array}\bigg\}$$

Furthermore, we have:

Yba=Yab where Yba is the relationship between the current of the B-phase piezoelectric element a2 and the voltage of the A-phase piezoelectric element a1 upon driving of the A-phase piezoelectric element a1, and is given by:

$$Yba = \frac{\text{output of }B\text{-phase current detector 8}}{\text{output of }A\text{-phase voltage detector 5}} \times \quad (4)$$

$$\cos(\text{output of phase difference detector 11}) +$$

$$j\frac{\text{output of }B\text{-phase current detector 8}}{\text{output of }A\text{-phase voltage detector 5}} \times$$

$$\sin(\text{output of phase difference detector 11})$$

$$Yaa - Ybb = \frac{A^2xa}{Zmx} + \frac{A^2ya}{Zmy} - \left[\frac{A^2yb}{Zmy} + \frac{A^2xb}{Zmx}\right]$$

$$= \frac{A^2\cos^2\theta}{Zmx} + \frac{A^2\sin^2\theta}{Zmy} - \frac{A^2\cos^2\theta}{Zmy} - \frac{A^2\sin^2\theta}{Zmx}$$

$$= A^2(\cos^2\theta - \sin^2\theta)\left[\frac{1}{Zmx} - \frac{1}{Zmy}\right]$$

$$Yab = \frac{Axa \cdot Axb}{Zmx} + \frac{Aya \cdot Ayb}{Zmy} \quad (5)$$

$$= \frac{A^2(-\sin\theta \cdot \cos\theta)}{Zmx} + \frac{A^2(\sin\theta \cdot \cos\theta)}{Zmy}$$

$$= A^2(\sin\theta \cdot \cos\theta)\left[\frac{1}{Zmx} - \frac{1}{Zmy}\right]$$

When Zmx, Zmy, and A are eliminated from formulas (4) and (5), we have:

$$\frac{-2 \cdot Yab}{Yaa - Ybb} = \frac{2\sin\theta \cdot \cos\theta}{\cos\theta - \sin\theta} = \tan 2\theta \quad (6)$$

These formulas are set in the arithmetic microcomputers 1, and the microcomputer 1 (FIG. 1) calculates the above-mentioned Yaa, Ybb, and Yab on the basis of the input data from the detectors 5 to 11, and obtains the above-mentioned θ, i.e., one of the two directions of rigidities. Also, the microcomputer 1 obtains the direction of a high or low rigidity according to the admittance characteristics shown in FIGS. 2A to 2E.

Figure 2D:
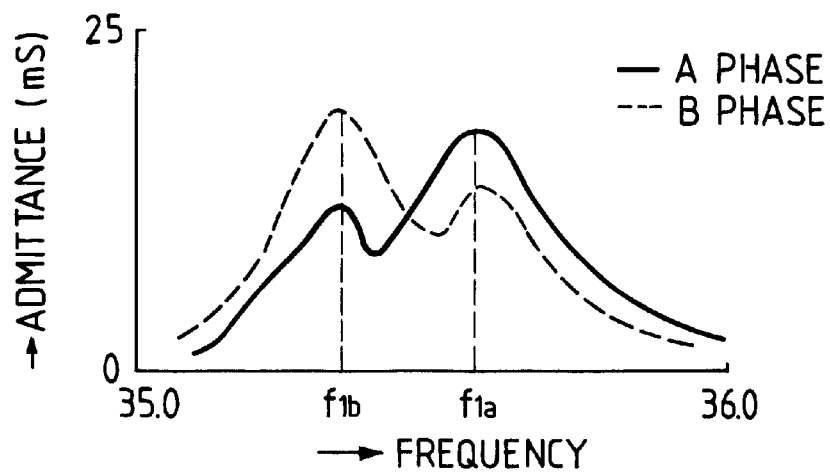
Figure 2E:
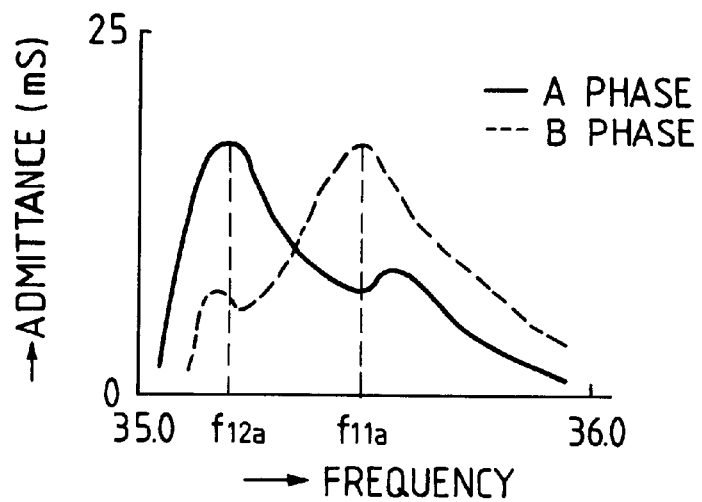

When a rigidity in a direction R1 (see FIG. 7) is high, the admittance characteristics are as shown in FIG. 2D; when a rigidity in a direction R2 (see FIG. 7) is high, the admittance characteristics of the A- and B-phase piezoelectric elements a1 and a2 are respectively as shown in FIG. 2E. When θ=0, and the rigidity in the direction R1 is high, the characteristics shown in FIG. 2A are obtained; when the rigidity in the direction R2 is high, the characteristics shown in FIG. 2B are obtained. Thus, the admittance characteristics (FIGS. 2A to 2E) of the elements a1 and a2 are obtained, and it is confirmed if the direction of the high rigidity of the vibrating element is the direction R1 or R2.

Then, a recess portion is formed on a surface portion of the vibrating member, which portion is located on or substantially on the direction of the high rigidity, and suffers from a large distortion caused by a vibration so as to have a proper depth (this depth corresponds to a difference between frequencies f1 and f2 or between frequencies f11 and f12 in FIGS. 2A and 2B, i.e., a frequency difference (f1–f2) or (f11–f12)), thereby decreasing the rigidity of the vibrating member in the above-mentioned direction.

Alternatively, a mass corresponding to the mass of the above-mentioned recess portion is decreased from a surface portion of the vibrating member, which portion is located along a direction different by 90° from the above-mentioned direction, and suffers from a small distortion caused by a vibration.

Figure 3:
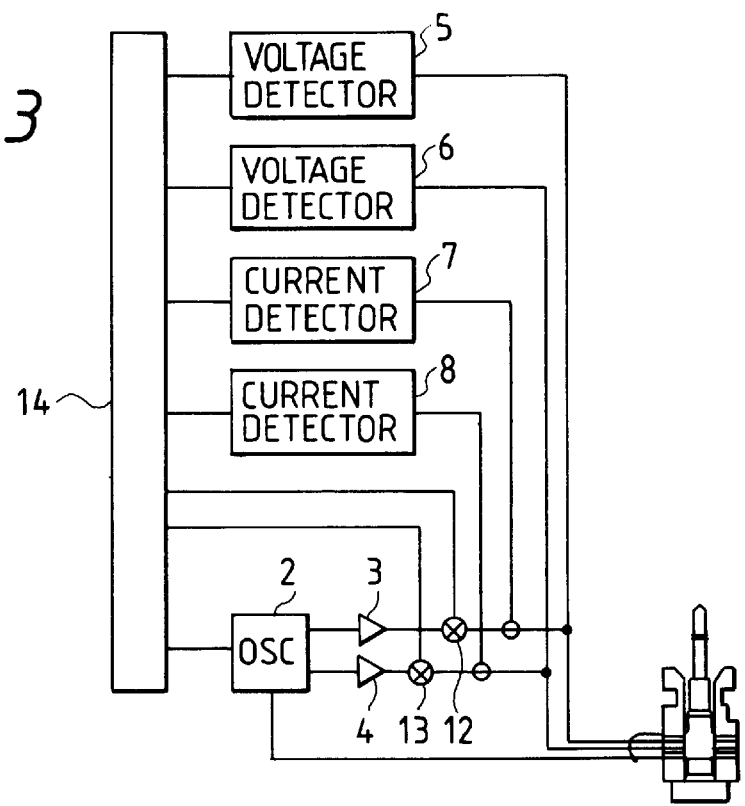
FIG. 3 is a block diagram showing a circuit arrangement of a detection apparatus according to another embodiment of the present invention.

FIG. 3 is a block diagram showing a circuit arrangement of a detection apparatus according to another embodiment of the present invention.

In the detection apparatus shown in FIG. 1, θ is calculated using the phase difference detectors 9, 10, and 11. However, in this embodiment, the outputs from amplifiers 3 and 4 can be varied by gain controllers 12, and 13, thereby obtaining θ, and determining the above-mentioned recess portion formation position or mass decreasing position.

More specifically, a vibration in only the vibration application direction of the A-phase piezoelectric element a1, and a vibration in only the vibration application direction of the B-phase piezoelectric element a2 can be excited in the vibrating member under the control of the gain controllers 12 and 13. The vibration application directions of the A- and B-phase piezoelectric elements a1 and a2 are formed perpendicularly to each other since the elements a1 and a2 are arranged perpendicularly to each other. If voltages having the same magnitude are applied to the A- and B-phase piezoelectric elements a1 and a2, the direction of the synthesized vibration corresponds to a direction shifted by −45° or 45° from the vibration application direction of the A- or B-phase piezoelectric element a1 or a2. By utilizing this phenomenon, the above-mentioned θ is obtained.

The frequency of an AC voltage to be applied to the A- or B-phase piezoelectric element a1 or a2 is sequentially changed to obtain the admittance characteristics shown in FIGS. 2A to 2C, thereby obtaining a frequency f1 or a frequency near the frequency f1, or a frequency f2 or a frequency near the frequency f2. Then, AC voltages having the frequency f1 or f2 are applied to the A- and B-phase piezoelectric elements a1 and a2.

At this time, the amplitudes of the AC voltage to be applied to the A- and B-phase piezoelectric elements a1 and a2 are sequentially changed to satisfy |Va|+|Vb|=constant (where |Va| is the absolute value of the voltage to be applied to a1; |Vb| is the absolute value of the voltage to be applied to a2 ), and a current Ia flowing through the piezoelectric element a1 at that time is detected by a detector 7. In FIG. 3, the same reference numerals denote elements having the same functions as those shown in FIG. 1.

Then, the maximum value of the current Ia (a current Ib flowing through the piezoelectric element a2 may be used; ideally, Ia+Ib is preferable) is obtained.

Figure 4:
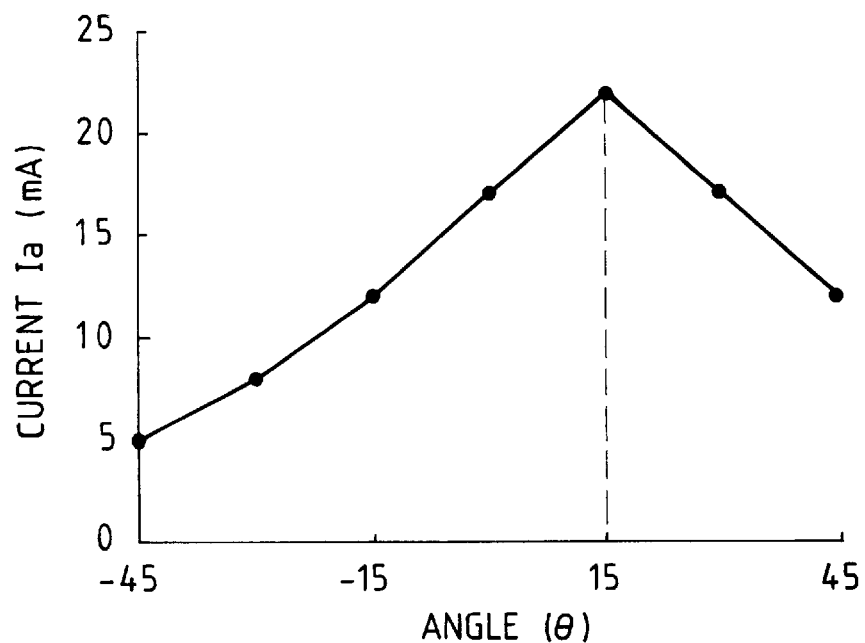
FIG. 4 is a graph showing the relationship between the angle and the current in the embodiment shown in FIG. 3.

A change in current Ia is plotted on the coordinate system shown in FIG. 4. In FIG. 4, an angle θ is plotted along the abscissa. The angle θ is defined as follows. That is, the magnitude of the voltage to be applied to the A-phase piezoelectric element a1 is plotted along the Y-axis, and the magnitude of the voltage to be applied to the B-phase piezoelectric element a2 is plotted along the X-axis. The angle θ is defined between a direction of a synthesized vector of these two voltages and the Y-axis. The magnitude of the current Ia is plotted along the ordinate.

The angle θ coincides with a synthesized vibration application direction generated in the vibrating member components a1, a2, b1, b2, c, and d (see FIG. 7) upon application of vibrations by the piezoelectric elements a1 and a2.

The angle θ corresponding to the maximum value or a value near the maximum value of the current Ia is obtained from FIG. 4 (of course, the angle θ need not be obtained by actually drawing the graph of FIG. 4 on paper, but may be obtained by utilizing a computer).

Since the angle θ represents the same content as that of the angle θ described in the first embodiment (i.e., the angle θ represents an angle formed between the direction of a high or low rigidity and the direction APD shown in FIG. 7), a recess portion or a hollow portion may be formed in a surface portion of the vibrating member, which portion is located along a direction coinciding or substantially coinciding with the direction R1 or R2 (see FIG. 7) based on the obtained θ. Alternatively, when the direction of the low rigidity is obtained, a mass may be added to the corresponding portion.

In this manner, the rigidities in the two directions can be caused to coincide with each other.

The direction of the high rigidity is determined by measuring the admittance characteristics of the piezoelectric elements shown in FIGS. 2A to 2C like in the first embodiment.

Figure 5:
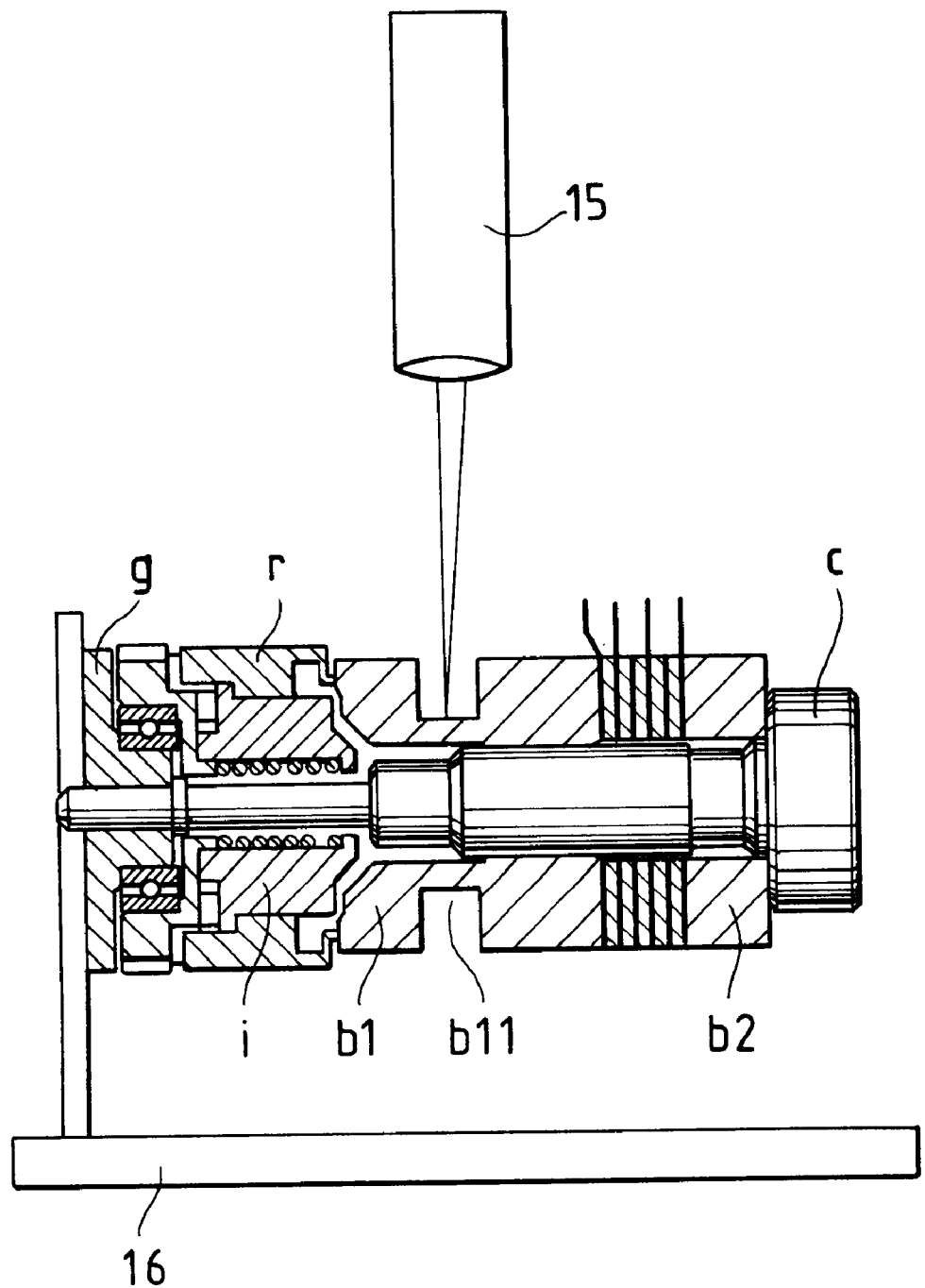
FIG. 5 is a view for explaining a working method for working a portion of a vibrating member, which portion corresponds to an angle detected according to the present invention.

Note that the rigidities in the two directions need not be caused to perfectly coincide with each other. In other words, the natural frequency of a given mode of the vibrating member upon excitation of the piezoelectric element a1 need not perfectly coincide with the natural frequency of the mode of the vibrating member upon excitation of the element a2. That is, no practical problem is posed if the two natural frequencies have a difference of about 200 Hz therebetween. FIG. 5 is a sectional view of the main part of an embodiment for forming the above-mentioned recess portion on the surface of the vibrating member using a laser.

In FIG. 5, a laser 15 radiates a laser beam onto a constricted portion b11 of the metal block b1. The vibrating member held by a vibrating member holder 16 is rotated, so that a surface portion of the vibrating member, which portion coincides or substantially coincides with the direction obtained according to the first or second embodiment, is irradiated with the laser beam. The correction amount of the natural frequency is adjusted by controlling the radiation time or a scan width of the laser beam.

In the above embodiment, a laser is used. Alternatively, the surface portion may be shaved using a file, a drill, a grindstone, or the like. The present invention is not limited to a bar-shaped vibration driven motor, but may be applied to an annular vibration driven motor.

Figure 6:
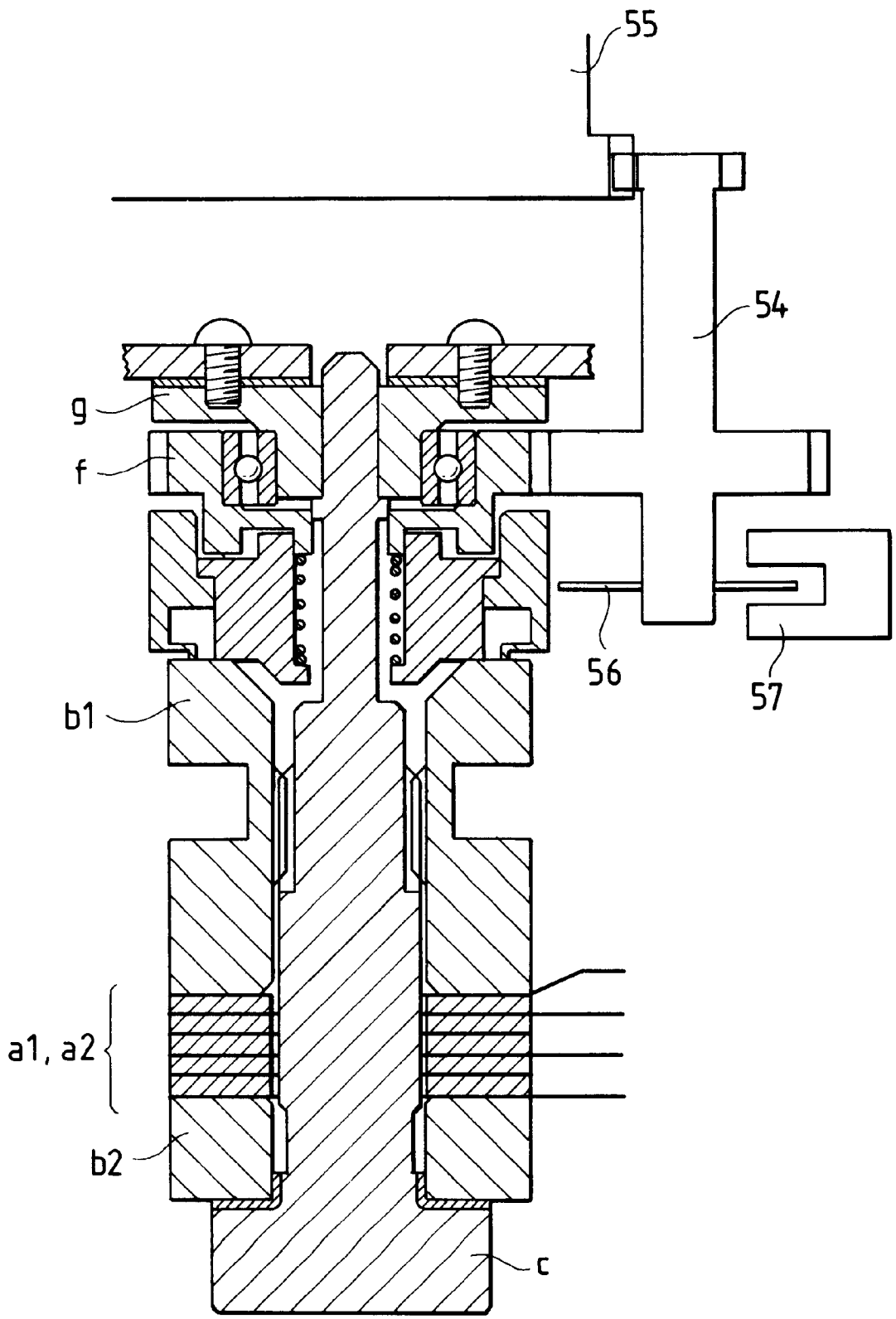
FIG. 6 is a sectional view showing the main part of an apparatus using a motor adjusted according to a method of the present invention as a driving source.

FIG. 6 shows a driving apparatus using a bar-shaped vibration driven motor worked by the method of the present invention. The apparatus includes a slit plate 56, a photocoupler 57, and a shaft 54 for coupling the motor and the apparatus 55 (in this case, a photographing lens driving unit for a camera). The output from the bar-shaped vibration driven motor is transmitted to the apparatus 55 through the shaft 54.

As described above, according to the present invention, two natural frequencies can be adjusted to have desired values, and motor performance can be improved. Since the normal mode of the vibrating member can be effectively adjusted in an assembled state, a motor or actuator can be manufactured at low cost.

What is claimed is:

1. A method of adjusting a natural frequency of a vibration driven actuator, which comprises a vibrating member and two electro-mechanical energy conversion members for generating vibrations in two directions in the vibrating member, comprising the steps of:

(a) determining directions of rigidities of said vibrating member by driving said two conversion members;

(b) determining a direction of a high or low rigidity of the vibrating member on the basis of frequency vs. admittance characteristics of said conversion members; and (c) decreasing or increasing a mass of the vibrating member, which mass is present on or substantially on the determined direction of the high or low rigidity.

2. A method according to claim 1, wherein a direction of rigidity is determined based on values of voltages supplied to the conversion members, values of currents flowing through the conversion members, and phase differences between the voltages supplied to the conversion members and the currents flowing through the conversion members when at least the conversion members are driven.

3. A method according to claim 1, wherein the step of determining the direction of the rigidity includes the steps of:

(a) obtaining frequency vs. admittance characteristics of at least one of the conversion members by scanning frequencies of AC signals to be applied to the conversion members, and obtaining a frequency corresponding to a peak value or a value near the peak value of the characteristics;

(b) changing directions of vectors of the vibrations generated in the vibrating member by applying AC signals having the obtained frequency to both the conversion members, and changing amplitudes of the AC signals; and (c) obtaining the direction of the vector when a peak value or a value near the peak value of a current flowing through at least one of the conversion members is obtained.

4. A method according to claim 1, wherein the direction of the high or low rigidity is determined based on peaks of frequency vs. admittance characteristics of the conversion members.

5. A method according to claim 1, wherein a decreasing or increasing amount of the mass to be decreased or increased from or to the vibrating member is determined according to a difference between frequencies corresponding to peak values or values near the peak values of frequency vs. admittance characteristics of the conversion members.

6. A method of adjusting a natural frequency of a vibration driven system, which comprises a vibrating member and two electro-mechanical energy conversion members for generating vibrations in two directions in the vibrating member, comprising the steps of:

(a) determining directions of rigidities of said vibrating member by driving said two conversion members;

(b) determining a direction of a high or low rigidity of the vibrating member on the basis of admittance characteristics of said conversion members; and (c) decreasing or increasing a mass of the vibrating member, which mass is present on or substantially on the determined direction of the high or low rigidity.

7. A method according to claim 6, wherein a direction of rigidity is determined based on values of voltages supplied to the conversion members, values of currents flowing through the conversion members, and phase differences between the voltages supplied to the conversion members and the currents flowing through the conversion members when at least the conversion members are driven.

8. A method according to claim 6, wherein the step of determining the direction of the rigidity includes the steps of:

(a) obtaining frequency vs. admittance characteristics of at least one of the conversion members by scanning frequencies of AC signals to be applied to the conversion members, and obtaining a frequency corresponding to a peak value or a value near the peak value of the characteristics;

(b) changing directions of vectors of the vibrations generated in the vibrating member by applying AC signals having the obtained frequency to both the conversion members, and changing amplitudes of the AC signals; and (c) obtaining the direction of the vector when a peak value or a value near the peak value of a current flowing through at least one of the conversion members is obtained.

9. A method according to claim 6, wherein the direction of the high or low rigidity is determined based on peaks of frequency vs. admittance characteristics of the conversion members.

10. A method according to claim 6, wherein a decreasing or increasing amount of the mass to be decreased or increased from or to the vibrating member is determined according to a difference between frequencies corresponding to peak values or values near the peak values of frequency vs. admittance characteristics of the conversion members.

11. A method for adjusting a natural frequency of a vibration driven actuator, the actuator comprising a vibrating member and two electro-mechanical energy conversion members for generating vibrations in two directions in the vibrating member, the method comprising the steps of:

determining respective directions of rigidities of said vibrating member by driving said two conversion members;

determining a direction of one of a high or low rigidity of the vibrating member; and decreasing or increasing a mass of the vibrating member at a location on or substantially on the determined direction of high or low rigidity.

12. A method for adjusting a natural frequency of a vibration driven actuator, the actuator comprising a vibrating member and two electro-mechanical energy conversion members for generating vibrations in two directions in the vibrating member, the method comprising the steps of:

determining respective directions of rigidities of said vibrating member;

determining a direction of one of a high or low rigidity of the vibrating member; and decreasing or increasing a mass of the vibrating member at a location on or substantially on the determined direction of high or low rigidity.

13. A method for determining a condition of a vibrating member for generating a vibration, comprising the steps of:

generating normal modes of vibration in the vibrating member, the normal modes of vibration being of the same vibration mode but respectively generated at different positions; and determining a difference between respective characteristics of the normal modes of vibration generated in the vibrating member by varying a direction of vibration generated in the vibrating member.

14. A method according to claim 13, wherein said characteristic is an admittance.

15. A method according to claim 13, wherein said characteristic is a voltage.

16. A method according to claim 13, wherein said characteristic is a current.

17. A method for determining a condition of a vibrating member for generating a vibration, comprising the steps of:

generating normal modes of vibration in the vibrating member, the normal modes of vibration being of the same vibration mode but respectively generated at different positions; and determining a difference between respective natural frequencies of the normal modes of vibration generated in the vibrating member by varying a direction of vibration generated in the vibrating member.

18. A method for determining a condition of a vibrating member having electro-mechanical energy conversion members for generating vibrations in two directions in the vibrating member, the method comprising the steps of:

determining directions of rigidities of said vibrating member by driving said two conversion members; and determining a difference between respective rigidities of the vibrating member in the determined directions on the basis of frequency vs admittance characteristics of said conversion members.

19. A method of adjusting a natural frequency of a vibration driven actuator, which comprises a vibrating member and two electro-mechanical energy conversion members for generating vibrations in two directions in the vibrating member, comprising the steps of:

(a) determining directions of rigidities of said vibrating member by driving said two conversion members;

(b) determining a direction of a high or low rigidity of the vibrating member on the basis of frequency vs. admittance characteristics of said conversion members; and (c) decreasing or increasing a rigidity of the vibrating member in a direction at least substantially along the determined direction of the high or low rigidity.

20. A method according to claim 19, wherein a direction of rigidity is determined based on values of voltages supplied to the conversion members, values of currents flowing through the conversion members, and phase differences between the voltages supplied to the conversion members and the currents flowing through the conversion members when at least the conversion members are driven.

21. A method of adjusting a natural frequency of a vibration driven system, which comprises a vibrating member and two electro-mechanical energy conversion members for generating vibrations in two directions in the vibrating member, comprising the steps of:

(a) determining directions of rigidities of said vibrating member by driving said two conversion members;

(b) determining a direction of a high or low rigidity of the vibrating member on the basis of admittance characteristics of said conversion members; and (c) decreasing or increasing a rigidity of the vibrating member in a direction at least substantially along the determined direction of the high or low rigidity.

22. A method according to claim 21, wherein a direction of rigidity is determined based on values of voltages supplied to the conversion members, values of currents flowing through the conversion members, and phase differences between the voltages supplied to the conversion members and the currents flowing through the conversion members when at least the conversion members are driven.

23. A method for determining a state of a vibrating member for generating a vibration, comprising the steps of:

applying a driving frequency to the vibration member in each of at least two normal modes of vibration, the at least two normal modes of vibration being of the same vibration mode but respectively generated in different directions, and scanning the driving frequency; and determining a difference between respective characteristics of the at least two normal modes of vibration generated in the vibrating member by varying the direction of a vibration generated in the vibrating member.

24. A method according to claim 23, wherein in the determining step the difference between respective characteristics of the at least two normal modes is determined on the basis of variation of admittance obtained by scanning the driving frequency for each of the at least two normal modes.

25. A method according to claim 24, wherein the determining step includes determining respective natural frequencies of the at least two normal modes on the basis of respective frequencies indicating peak admittances upon scanning the driving frequency for each of the at least two normal modes.

26. A method according to claim 25, wherein the determining step includes providing a difference between respective frequencies indicating peak admittance in the at least two normal modes.

27. A method according to claim 23, further comprising the step of changing a form of the vibration member so as to minimize a difference between respective characteristics of the at least two normal modes.

28. A method according to claim 24, further comprising the step of changing a form of the vibration member so as to minimize a difference between respective frequencies indicating peak admittance upon scanning the frequency in each of the at least two normal modes.

29. A method according to claim 27, wherein the determining step includes changing a direction of vibration of at least one of the at least two normal modes by changing the form of the vibration member.

30. A method according to claim 28, wherein the determining step includes changing a direction of vibration of at least one of the at least two normal modes by changing the form of the vibration member.

* * * * *

UNITED STATES PATENT AND TRADEMARK OFFICE
CERTIFICATE OF CORRECTION

PATENT NO. : 5,986,385

DATED : November 16, 1999

INVENTOR(S): AKIO ATSUTA

It is certified that error appears in the above-identified patent and that said Letters Patent is hereby corrected as shown below:

On the title page:

At [56] References Cited

Myohiga et al." should read --Myohga et al.--.

At [57] ABSTRACT

Line 7, "shaved" should read --is shaved--.

Column 3

Line 11, "according an" should read --according to an--.

Signed and Sealed this

Nineteenth Day of September, 2000

Attest:

Q. TODD DICKINSON

*Attesting Officer*   *Director of Patents and Trademarks*